C. W. LAIRD.
HORSESHOE.
APPLICATION FILED JAN. 3, 1908.
899,417.  Patented Sept. 22, 1908.
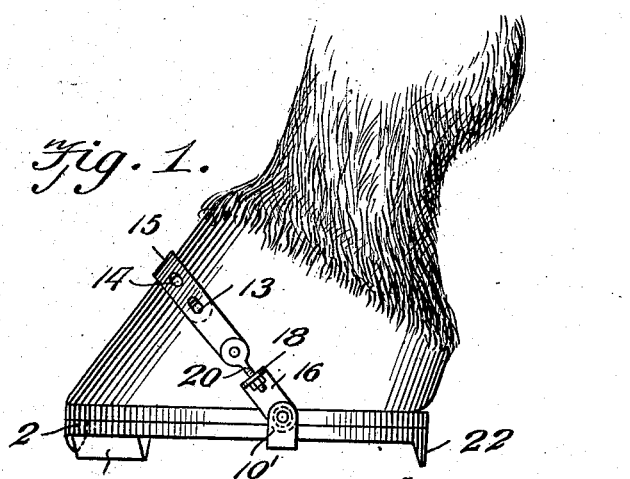
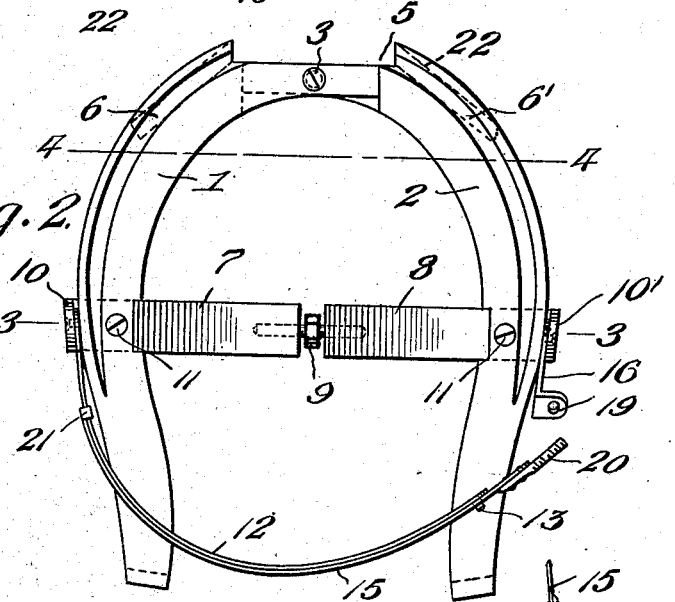
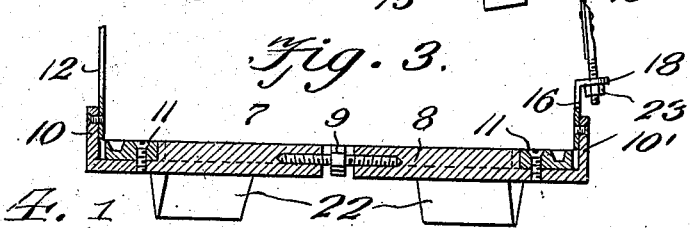
Inventor
Charles W. Laird
By Victor J. Evans
Attorney
Witnesses
Frank B. Hoffman

UNITED STATES PATENT OFFICE.

CHARLES W. LAIRD, OF MEMPHIS, NEW YORK.

HORSESHOE.

No. 899,417.        Specification of Letters Patent.        Patented Sept. 22, 1908.

Application filed January 3, 1908. Serial No. 409,190.

*To all whom it may concern:*

Be it known that I, CHARLES W. LAIRD, a citizen of the United States, residing at Memphis, in the county of Onondaga and State of New York, have invented new and useful Improvements in Horseshoes, of which the following is a specification.

This invention relates to horse shoes and the object of the invention is to provide a device adapted for attachment to the ordinary shoes of a horse whereby the animal is prevented from slipping.

Another object of the invention is to provide an attachment to the ordinary shoes upon a horse which may be adjusted to the various sizes of the horse shoes, which may be easily and quickly applied and which may be readily detached when desired.

To these ends the invention resides in the novel construction of attachment for horse shoes hereinafter fully described and claimed.

In the drawings, Figure 1 is a side elevation of my device in applied position. Fig. 2 is a top plan view of the device. Fig. 3 is a cross sectional view upon the line 3—3 of Fig. 2, and Fig. 4 is a similar view on the line 4—4 of Fig. 2.

The main object of this invention is to provide an attachment for horses' shoes adapted to be applied over the ordinary shoe without disturbing the latter, and to produce a device of this character, adapted to be applied to the shoes in sleety and slippery weather to prevent the horse from slipping and falling, and which is so constructed as to be readily and easily applied to the various sizes of shoes worn by horses.

As illustrated in the accompanying drawings my device is primarily constructed of two separate members 1 and 2, having their meeting ends connected as at 3. As clearly illustrated in Fig. 4 of the drawings the member 1 has its end provided with a horizontal cutaway portion adapted to fit over and engage upon the cutaway portion 4 provided upon the member 2. The meeting ends, or toe of the device are provided with the vertical and longitudinal cutaway portion 5, adapted for the reception of the front calks of the ordinary horse shoe.

The members 1 and 2 are provided with suitable recesses 6 and 6' near their outer edges extending rearwardly a suitable distance and adapted for the reception of the nails of the ordinary shoe.

The members 1 and 2 are of a contour corresponding with the shape of an ordinary horse shoe and are provided near their centers with suitable bars 7 and 8, provided near their meeting ends with suitable threaded openings adapted for the reception of a right and left handed screw having a centrally disposed operating head 9. The bars 7 and 8 are suitably recessed or cut away at their engagement with the members 1 and 2 and are provided with the angular upward extensions 10 and 10'. The members 1 and 2 are also recessed upon their inner faces at their points of engagement with the bars 7 and 8, whereby a rigid connection is provided between the members and the bars. Suitable securing elements, such as bolts 11 are employed to connect the members 1 and 2 with the bars 7 and 8.

The extension 9 provided by the bar 7 is pivotally engaged with a metallic strap 12, having its outer edge provided with a stud 13 adapted for reception with one of a series of perforations 14 provided upon a strap 15 adapted for slidable engagement with the strap 12. The vertical extension 10' of the bar 8 is provided with a pivotal ear 16 having a right angular extension 18 having a perforation 19 adapted to engage a screw threaded extension 20 provided upon the extremity of the strap 15. The opposite end of the strap 15 is provided with a loop 21 adapted for engagement with the strap 12, whereby the straps 12 and 15 are secured together. The members 1 and 2 are provided with heel and side calks 22 for preventing slipping of the animal to which the device is applied.

From the above description it will be noted that I have provided an attachment for ordinary horse shoes which is easily applied and quickly adjusted to any ordinary horse shoe and which is held securely in applied position. It will be also noted that my device is easily adjusted to the various sizes of horse shoes and that by the cut away portion provided at the toes of the members comprising my device, the front calk of the horse shoe, which is adapted to be received within this cut away portion acts as a brace for the attachment, and the upstanding members 10 and 10' engaging either side of the horse shoe supports the device upon the sides of the shoe, while the straps 12 and 15 are engaged across the front of the horse's hoof at a right angle in regard to the slope of the hoof, the threaded extension 20 of the strap 15 engages within the perforation provided by the ear 16, connected with the vertical portion 10' of the bar 8, and is held in secure engagement by a nut or retaining element 23, it being understood that the stud 13 is secured in one of the perforations or openings 14 provided upon the strap 15 before the retaining element 23 is secured upon the threaded extension 20 of the strap 15, thus effectively retaining the device upon a horse shoe.

While I have described the preferred embodiment of my invention it will be understood that minor details of construction may be resorted to without departing from or sacrificing any of the spirit of the invention.

Having thus described my invention what is claimed as new is:

1. An attachment for horse shoes comprising a pair of members of shape corresponding with the horse shoe, the members being cut away at their point of connection for the reception of the calk of the horse shoe and being provided with channels near their outer ends adapted for the reception of the nails of the horse shoe, the members being provided with diametrically opposite cut away portions adapted for the reception of the reduced portions formed upon a pair of bars, a right and left handed screw connecting the inner ends of the bars, ears upon the outer ends of the bars, pivoted straps upon the ears, and means for adjusting the straps.

2. An attachment for horse shoes comprising a pair of members of a shape corresponding to that of the horse shoe, the members being pivoted together and being provided with a cut away portion at their point of connection for the reception of the calk of the horse shoe, the members being provided with the channels near their outer ends for the reception of the nails of the horse shoe, calks upon the members, a pair of alining bars connected to the members, the bars being provided with right and left handed threaded openings, a right and left handed screw for the openings, the bars being provided with upwardly extending ears at their outer ends, a strap connected with one of the ears, a stud upon the strap, a second strap provided with spaced openings and provided with a loop engaging the first strap, a threaded extension upon the second strap, an L-shaped bracket pivotally connected with the ear of the opposite bar, the horizontal member of the bracket being provided with an opening adapted for the reception of the threaded extension of the second strap, a securing element for the extension, and one of the openings of the second strap adapted to engage the stud of the first strap.

In testimony whereof I affix my signature in presence of two witnesses.

CHARLES W. LAIRD.

Witnesses:
 WALTER H. RODGER,
 ELLA R. LAIRD.